(12) United States Patent
Chelaidite

(10) Patent No.: US 10,267,371 B2
(45) Date of Patent: Apr. 23, 2019

(54) DEVICES FOR OPERATING A PARKING BRAKE

(71) Applicant: AKEBONO BRAKE INDUSTRY CO., LTD, Chuo-ku, Tokyo (JP)

(72) Inventor: Galus Chelaidite, South Lyon, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 9 days.

(21) Appl. No.: 15/496,220

(22) Filed: Apr. 25, 2017

(65) Prior Publication Data

US 2017/0328432 A1     Nov. 16, 2017

Related U.S. Application Data

(60) Provisional application No. 62/336,957, filed on May 16, 2016.

(51) Int. Cl.
| | |
|---|---|
| *F16D 65/18* | (2006.01) |
| *F16D 55/225* | (2006.01) |
| *F16D 65/00* | (2006.01) |
| *F16D 65/40* | (2006.01) |
| F16D 127/06 | (2012.01) |
| F16D 121/26 | (2012.01) |
| F16D 125/36 | (2012.01) |
| F16D 125/40 | (2012.01) |
| F16D 125/48 | (2012.01) |

(Continued)

(52) U.S. Cl.
CPC ....... *F16D 65/183* (2013.01); *F16D 65/0075* (2013.01); *F16D 65/40* (2013.01); *F16D 2121/24* (2013.01); *F16D 2121/26* (2013.01); *F16D 2125/36* (2013.01); *F16D 2125/40* (2013.01); *F16D 2125/46* (2013.01); *F16D 2125/48* (2013.01); *F16D 2127/06* (2013.01)

(58) Field of Classification Search
CPC ...... F16D 55/227; F16D 63/004; F16D 65/16; F16D 65/18; F16D 65/40; F16D 65/183
USPC ..................... 188/156–164, 72.2, 72.7, 72.8
See application file for complete search history.

(56) References Cited

U.S. PATENT DOCUMENTS

| | | | | |
|---|---|---|---|---|
| 5,090,518 A | * | 2/1992 | Schenk | ..................... B60T 8/00 188/157 |
| 7,806,241 B2 | * | 10/2010 | Takahashi | ............. B60T 13/746 188/157 |

(Continued)

FOREIGN PATENT DOCUMENTS

EP           3009705 A1     4/2016

*Primary Examiner* — Christopher P Schwartz
(74) *Attorney, Agent, or Firm* — The Dobrusin Law Firm, P.C.

(57) ABSTRACT

An assembly that includes a parking brake system including two or more spindle/nut devices. The two or more spindle/nut devices include a high efficiency device and a low efficiency device. The high efficiency device is in communication with a first end of a brake pad, and the low efficiency device in communication with a second end of the brake pad. The high efficiency device moves the first end of the brake pad against a braking surface, and the low efficiency device moves the second end of the brake pad against the braking surface. After one or both of the ends of the brake pad are moved against the braking surface and a clamping force is created, the low efficiency device locks and prevents movement of the high efficiency device so that the clamping force is maintained.

20 Claims, 1 Drawing Sheet

(51) Int. Cl.
*F16D 121/24* (2012.01)
*F16D 125/46* (2012.01)

(56) References Cited

U.S. PATENT DOCUMENTS

| | | | |
|---|---|---|---|
| 8,220,593 B2* | 7/2012 | Baumgartner | F16D 65/092 |
| | | | 188/162 |
| 9,297,433 B2 | 3/2016 | Takewaki et al. | |
| 9,316,277 B2 | 4/2016 | Winklet et al. | |
| 9,333,953 B2 | 5/2016 | Masuda et al. | |
| 9,340,190 B2 | 5/2016 | Qian et al. | |
| 2004/0159509 A1* | 8/2004 | Chang | F16D 65/18 |
| | | | 188/156 |
| 2005/0034936 A1 | 2/2005 | Drennen et al. | |
| 2009/0026024 A1 | 1/2009 | Baldeosingh et al. | |
| 2012/0111673 A1 | 5/2012 | Giering et al. | |
| 2015/0362051 A1 | 12/2015 | Adler et al. | |
| 2016/0069403 A1 | 3/2016 | Yamasaki et al. | |
| 2016/0076607 A1 | 3/2016 | Yasui et al. | |
| 2016/0076631 A1 | 3/2016 | Funada | |
| 2016/0131212 A1 | 5/2016 | Yamasaki et al. | |
| 2016/0215840 A1* | 7/2016 | Chelaidite | F16D 55/227 |
| 2017/0058979 A1* | 3/2017 | Bahmata | F16D 65/18 |

\* cited by examiner

DEVICES FOR OPERATING A PARKING BRAKE

FIELD

The present teachings relate to devices for creating and maintaining clamping force in a parking brake system.

BACKGROUND

Some vehicles, including passenger cars and trucks, use single-piston hydraulic brake systems for vehicle deceleration. These vehicles may also have a parking brake system that utilizes the same single piston of the service brake for creating clamping force to maintain the vehicle in a stopped or parked position. In these parking brake systems, a motor may generate sufficient torque to move the single piston, and therefore, the brake pads against the brake rotor to create the clamping brake force.

Other vehicle platforms, like full-size trucks, vans, and SUVs, use multi-piston hydraulic brake systems only for vehicle deceleration, and a separate parking brake system for maintaining the vehicle in a parked position.

To improve parking brake performance, while also reducing weight, costs, complexity, assembly time, and packaging space, in some vehicle platforms, it may be desirable to have a parking brake system that utilizes an existing multi-piston brake system of the service brake without requiring a super high output motor to move all of the pistons and the brake pads against the brake rotor to create the clamping force. For example, it may be attractive to have a parking brake system for a heavy-duty vehicle platform with a multi-piston brake system that can use a motor from a light-duty vehicle platform to sufficiently move the pistons and brake pads against a brake rotor to create a sufficient clamping force. For example, rather than using a large motor, multiple motors, or motors from a heavy-duty application, all of which can be costly and heavy, it may also be desirable to use a motor from a light-duty vehicle platform to move multiple pistons and brake pads against a brake rotor to create a sufficient clamping force and also prevent the clamping force or motor from releasing or back driving after the clamping force has been created.

SUMMARY

The present teachings provide an improved parking brake system. More specifically, the present teachings provide improved devices for a parking brake system. The present teachings provide devices for creating, maintaining, and releasing a clamping force. More specifically, one or more of the spindle/nut devices according to the teachings herein may be high efficiency devices, low efficiency devices, or both for moving a brake piston, a brake pad or both. Preferably, one of the spindle/nut devices may be a high efficiency device, and one of the spindle/nut devices may be a low efficiency device.

The present teachings provide a parking brake system that uses a smaller motor, a motor from a light-duty application, or a motor that generates or produces less torque than conventional, known parking brake system to move one or more brake pistons and the one or more brake pads towards and/or away from a brake rotor to create and/or release a clamping force, respectively.

For example, a motor from a light-duty vehicle platform can be used on a heavy-duty vehicle platform to sufficiently move one or more pistons and/or brake pads against a brake rotor to create a sufficient clamping force. Moreover, the teachings provide a parking brake system for a heavy-duty vehicle platform that can use a motor from a light-duty vehicle platform to sufficiently move the pistons and/or the brake pads away from the brake rotor to release the clamping force. The teachings herein may advantageously, and desirably, reduce weight, costs, and packing space of a brake system, a parking brake system, or both.

These teachings also advantageously reduce or prevent back driving of the system after the clamping force has been generated. This advantageously may prevent the brake system from prematurely or unintendedly releasing the clamping force.

These teachings achieve one or more of the above-mentioned desires by providing a brake system that has two or more spindle/nut devices. One of the spindle/nut devices is a high-efficiency device that requires very little torque to move due to it being a high-efficiency device. The other spindle/nut device is a low-efficiency device, which requires more torque to move (compared to the high-efficiency device, for example, but may function to lock or prevent the system from back driving or releasing the clamping force after the clamping force is generated.

The present teachings provide an assembly, comprising a parking brake system that has two or more spindle/nut devices. The two or more spindle/nut devices are a high efficiency device and a low efficiency device. The high efficiency device is in communication with a first end of a brake pad, and the low efficiency device in communication with a second end of the brake pad. The high efficiency device moves the first end of the brake pad against a braking surface, and the low efficiency device moves the second end of the brake pad against the braking surface. After one or both of the ends of the brake pad are moved against the braking surface and a clamping force is therefore, created, the low efficiency device self-locks thus maintaining clamp force on its end of the pad, as well as prevents movement or a back drive of the high efficiency device so that the clamping force is maintained on the high efficiency device side of the pad. The low-efficiency device self-locks by virtue of the engagement of the thread angle/pitch of the spindle and the nut engagement. This engagement requires additional torque from the motor to unlock, as opposed to the engagement of the high-efficiency device, which requires very little torque to unlock.

The present teachings also provide an assembly including a brake caliper and a parking brake system. The brake caliper includes a brake pad, a first piston in communication with a first end of the brake pad, and a second piston in communication with a second end of the brake pad. A first spindle/nut device is in communication with the first piston; a second spindle/nut device is in communication with the second piston; and a motor or a motor gear unit causes both the first spindle/nut device and the second spindle/nut device to move. Movement of the first spindle/nut device causes the first piston to move so that the first end of the brake pad moves. Movement of the second spindle/nut device causes the second piston to move so that the second end of the brake pad moves. The first spindle/nut device is a high efficiency mechanism that may be a ball screw or a ball ramp mechanism, and the second spindle/nut device is a low efficiency mechanism that may be a lead screw.

The present teachings further provide a method of operating a parking brake that includes: applying torque to a first spindle/nut device so that an end of a brake pad moves relative to a braking surface; and applying torque to a second spindle/nut device so that another end of the brake pad moves relative to the braking surface. The second spindle/nut self-locks and prevents a brake release on both ends of the braking surface.

It is understood that while this application focuses on generating clamping force for a parking brake apply, it is within the scope of this application that these teachings can be applied to a service brake. That is, for example, rather than the service brake being applied by virtue of pressurizing hydraulic fluid to move the brake pistons and brake pads into contact with the brake rotor, the service brake can be applied with the MGU or another motor, which function to move the spindle/nut devices as discussed herein for application of the parking brake.

DETAILED DESCRIPTION

Figure 1:
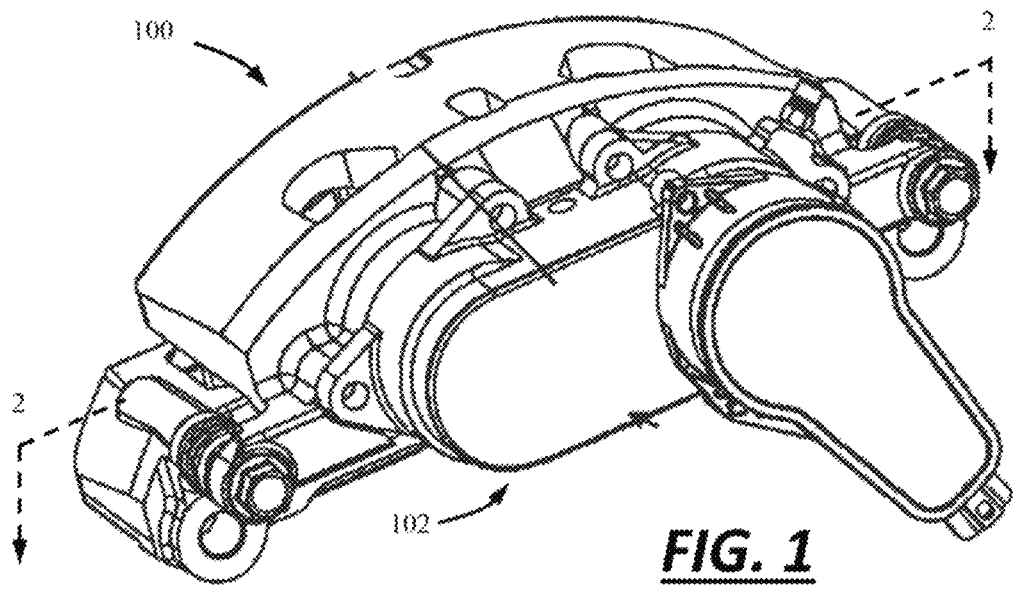
FIG. 1 is a perspective view of a brake system according to the teachings herein.

This application claims the benefit of U.S. Provisional Application No. 62/336,957 filed on May 16, 2016, the contents of which is hereby incorporated by reference herein for all purposes.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved parking brake system. More particularly, the description herein relates to improved devices for parking brake systems. The present teachings may be used with a service brake system and/or a parking brake system in any vehicle. The parking brake system may use one or more components of the service brake system. The teachings herein can be used in a light duty and/or heavy duty car, truck, bus, train, airplane, all terrain vehicle, etc. The present teachings may also be used in non-vehicular applications. For example, the teachings herein may be applied to brake systems used in various machines, such as a lathe, a winder for paper products or cloth, amusement park rides, wind turbines, or the like.

The teachings herein provide a brake system. The brake system may be any system or assembly to create a clamping force. The brake system may be any type of brake system. For example, the brake system may be an opposing brake system (i.e., a fixed caliper) or a floating brake system (i.e., a floating caliper). The brake system may be a service brake system. The service brake system may generally include a brake rotor, one or more brake pads, and a brake caliper supporting one or more pistons. A parking brake system may be added to or integrated with the service brake system.

The clamping force may be a force that, when coupled with a brake pad coefficient of friction, functions to decelerate, slow, stop, and/or prevent movement or rotation of a brake rotor and/or a vehicle. The clamping force may be created during a standard brake apply (i.e., a brake apply force). The clamping force may be created during a parking brake apply (i.e., a parking brake force).

The brake rotor may cooperate with the components of the brake system, the parking brake system, or both to create the clamping force. The brake rotor may include an inboard side and an opposing outboard side. The brake caliper may have one or more brake pads located at the inboard side of the brake rotor (i.e., inboard brake pads), one or more brake pads at the outboard side of the brake rotor (i.e., outboard brake pads), or both. The brake caliper may have one or more pistons located at the inboard side, one or more pistons located at the outboard side, or both. When the vehicle is in motion, the brake rotor may rotate with a wheel and about an axle of a vehicle. To create the clamping force during a standard brake apply, or during a parking brake apply, the friction material of one or more brake pads can be moved or pushed against at least one of the sides of the brake rotor. After the clamping force is created, the brake rotor may be restricted from moving and/or rotating, and, accordingly, the vehicle may be slowed, stopped, and/or restricted from moving. To release the clamping force, the friction material of the one or more brake pads can be moved away from the brake rotor to release the clamping force. After the clamping force has been released, the brake rotor and, accordingly, the vehicle may move again.

One or more brake pads may be used to create the clamping force. The clamping force can be used to convert the kinetic energy of the vehicle into thermal energy by frictionally engaging one or more sides of the brake rotor with one or more brake pads. The one or more brake pads may include one or more features (i.e. ears, projections, etc.) that may engage or be engaged by a brake caliper, a support bracket, or both to maintain the location of the brake pads within the braking system and relative to the brake rotor.

The one or more brake pads may include a friction material and a pressure plate. The one or more brake pads may be supported on the brake caliper so that the friction material faces a side of the brake rotor. The pressure plate may oppose the friction surface. One or more pistons, one or more brake caliper fingers, or both may be in selective contact with the pressure plate of a corresponding brake pad. For example, in some cases, one or more pistons may be in contact with the pressure plate of an inboard brake pad, and one or more brake caliper fingers may be in contact with the pressure plate of an outboard brake pad. In other cases, one or more pistons may be in contact with the pressure place of an inboard brake pad, and one or more pistons may be in contact with the pressure place of an outboard brake piston. During a brake apply, or while applying the parking brake, the one or more pistons and/or the one or more fingers can move all or an end of a corresponding brake pad so that the corresponding friction material engages a corresponding side of the brake rotor to create the clamping force.

The one or more brake pads may comprise one or more inboard brake pads that are moveable towards and away from an inboard side of the brake rotor. The one or more brake pads may comprise one or more outboard brake pads that are moveable towards and away from an outboard side of the brake rotor. When the brake system, the parking brake system, or both are applied or released, the brake pads (e.g., the inboard and outboard pads), or portions of the brake pads can be moved relative to the brake rotor together, individually, sequentially, or a combination thereof. In other words, the brake pads can be moved towards and/or away from the brake rotor at the same time, or one or more brake pads can be moved before one or more other brake pads are moved. A first end of a brake pad (i.e., a leading end) may be moved towards or away from the brake rotor together, individually, sequentially, before, after, or in any combination thereof with a second end of the same brake pad (i.e., a trailing end).

The distance that the one or more of the brake pads are moved, or the distance that the ends of one or more brake pads are moved relative to the brake rotor to create the clamping force may vary depending on taper wear. Taper wear may be defined as the tendency of the friction material of a brake pad to wear unevenly during use. Taper wear may result in the inboard, outboard or both sides of a rotor no longer being parallel to the pressure plate of a brake pad. For example, during a brake apply, a parking brake apply, or both, a first end (i.e., a leading end) of a brake pad may contact the brake rotor first and/or with greater force than the second end of the brake pad (i.e., a trailing end), (or vice versa). This may cause the first end to wear more, or wear faster, than the second end, (or vice versa). Over time, therefore, the first end may be required to move a greater distance than the second end, (or vice versa), to engage the brake rotor and create the clamping force.

The brake caliper may function to support one or more the components of the brake system, one or more the components of the parking brake system, or both. For example, the brake caliper may include one or more supports configured to engage and/or support the one or more brake pads. The brake caliper may provide for one or more brake pads, or, preferably, two or more brake pads to move relative to the brake rotor. The brake caliper may move during a brake apply (i.e., a floating caliper), or the brake caliper may be fixed so that the brake caliper does not move during a brake apply (i.e., a fixed caliper). The brake caliper may be connected to any part of a vehicle, like a support or a knuckle.

The brake caliper may have one or more caliper bores. Each caliper bore may define one or more hollow regions in the brake caliper configured to receive and support a corresponding piston. Preferably, the brake caliper has two or more caliper bores. The caliper bores can be located on only one side of the brake rotor, or on both sides of the brake rotor. Each caliper bore includes a caliper bore axis. The caliper bore axis may extend generally perpendicular to a side of the brake rotor. A piston supported within a caliper bore may be moved along the caliper bore axis to create or release a clamping force.

The one or more pistons may function to move a brake pad, or a corresponding end of brake pad, towards the rotor to create the clamping force. During a standard brake apply to decelerate or stop a vehicle, the piston may be moved by pressurizing brake fluid. To release the standard brake apply, the piston can be moved by depressurizing the brake fluid. During a parking brake apply, the piston may be moved by moving a corresponding spindle/nut device. To release the parking brake apply, the piston can be moved by moving a corresponding spindle/nut device in an opposing direction. During both a parking brake apply and a standard brake apply, the piston may be moved along a piston axis, which may be collinear or essentially collinear with the caliper bore axis. The piston may include a closed end selectively engaging the pressure plate of an inboard brake pad and an open end defining an opening into a piston pocket.

The piston pocket may function to receive at least a portion of a corresponding spindle/nut device. The piston pocket may be a cup or recess formed into one end of a piston. The piston pocket may include a bottom wall. A gap may exist between the nut and a corresponding bottom wall. During a parking brake apply, the gap is taken up by moving the nut towards the bottom wall. Once the gap is taken up, further movement of the nut causes the nut to press against the bottom wall and move the piston and thus brake pad against the rotor to create the clamping force.

The nut may be prevented from rotating within the piston pocket. For example, the nut may be keyed to an inner portion of the piston pocket. For example, a clutch may be located between the nut and the piston pocket, which may cause the nut to rotate in the piston pocket after a sufficient torque has been applied to the nut, as disclosed in commonly owned patent application No. 62/263,198 filed on Dec. 4, 2015, the contents of which is expressly incorporated by reference herein for all purposes.

A parking brake system may be added to or integrated with the service brake system. The parking brake system may function to create a clamping force to maintain a vehicle in a stopped or parked position, preferably for an extended period of time. The parking brake system may use one or more components of the brake system to create the clamping force. For example, the one or more pistons and the brake pads may be moved against the rotor to create the clamping force. The one or more pistons and the brake pads may be moved away from the rotor to release the clamping force. The parking brake assembly may comprise a motor gear unit (MGU), one or more gears, one or more spindle/nut devices, a clutch, or a combination thereof.

The motor gear unit (MGU) may function to generate and transfer a force or torque that is suitable for creating and/or releasing a clamping force. During application of the parking brake, to create a clamping force, the MGU may function to generate torque sufficient to move the one or more spindle/nut devices, the one or more pistons, the one or more brake pads, or a combination thereof. During release of the parking brake, to release the clamping force, the MGU may function to generate torque sufficient to move the one or more spindle/nut devices, the one or more pistons, or both away from the one or more brake pads so that the brake pads move away from the rotor. The motor gear unit (MGU) may be any device or combination of devices that may function to perform one or more of the aforementioned functions.

The motor gear unit (MGU) may include a motor. The motor may be any suitable motor. For example, the motor may be a DC motor, a brushless motor, a series-wound motor, a shunt wound motor, a compound wound motor, a separately exited motor, a servomotor, or a permanent magnet motor. The MGU may include one or more gears (i.e., a gear train) that may function to transfer, increase, and/or decrease an output torque of the motor. At least a portion of the MGU may be contained within a housing. The housing may be integrally formed with the brake caliper; removably attached to the brake caliper; permanently attached to the brake caliper; or attached in any suitable way to any part of the vehicle, such as a support, support bracket, or knuckle.

An output of the MGU may be in communication with one or more gears. The output of the MGU may be in direct communication with one or more of the gears associated with the leading edge of the brake pad and/or the high efficiency spindle/nut device. However, in some configurations, the MGU may be in direct communication with one or more of the gears associated with the trailing edge of the brake pad and/or the low efficiency spindle/nut device. In other configurations, the output of the MGU may not be in direct communication with either gear, but instead, in communication with a transfer gear that is in communication with one or more other gears associated with the leading edge, the trailing edge, the high efficiency device, the low efficiency device, or a combination thereof.

The one or more gears may function to receive torque from the motor or the MGU. The one or more gears may function to transfer the torque from the motor or MGU to one or more of the spindle/nut devices. The first and second gears may be inter-connected so that both gears rotate together when only one of the gears is rotated directly by the motor or MGU. Each of the first and second gears may include teeth, grooves, notches, channels, or like features for connecting the gears together. The gears can be connected via any suitable feature or device, such as a belt, chain, and/or linkage. The first and second gears may include the same number of teeth, grooves, notches, and/or channels so that both gears rotate at the same speed. In other words, the ratio of teeth on the first gear to second gear may be 1:1. In some configurations, it may be desirable for the first gear to have more teeth, grooves, notches, and/or channels than the second gear so that the first gear rotates faster than the second gear. In other configurations, it may be desirable for the first gear to have less teeth, grooves, notches, and/or channels than the second gear so that the first gear rotates slower than the second gear.

The output of the first gear may be in communication with a first spindle of a first spindle/nut device, and the output of the second gear may be in communication with a second spindle of a second spindle/nut device, or vice versa.

The one or more spindle/nut devices may function to transfer torque from the MGU, the one or more gears, or both to the corresponding piston. More specifically, the one or more spindle/nut devices may function to convert torque from the MGU or a corresponding gear into a linear load or axial force to move a brake piston and a brake pad. Each of the spindle/nut devices may include a spindle and a nut.

The one or more spindles may cooperate with a corresponding nut to convert torque from the MGU or a corresponding gear into a linear load or axial force to move a corresponding piston, and thus a corresponding brake pad against the rotor to create the clamping force. Each of the one or more spindles may have an input portion that is in communication with a corresponding gear, and an output portion that is in communication with a corresponding nut. The input portion may receive torque from the MGU or corresponding gear, which may cause the spindle to rotate. Rotation of the spindle may cause the nut to move axially.

Rotation of the spindle in the first or apply direction may cause the nut to move and contact the bottom wall and thus move the piston and the brake pad against the rotor to create the parking brake force. Accordingly, rotation of the spindle in the second or release direction may cause the nut to move away from the bottom wall so that the piston and the brake pad move away from the rotor thus releasing the parking brake force. The spindle may be rotated about a spindle axis, which may be the same as, or at least collinear with, a piston axis, a caliper bore axis, a nut axis, or a combination thereof.

The input portion of the spindle may include any suitable connection for connecting with the corresponding gear. For example, the connection may include a threaded engagement, a splined or keyed engagement, a friction engagement, and/or the input portion may be coupled to the motor gear unit with one or more mechanical fasteners. Preferably, the connection is keyed (i.e., may include teeth, gears, notches, grooves, etc.). The output portion of the spindle may include any suitable connection for connecting with the nut. In some configurations, the output portion may engage a corresponding nut with a threaded engagement (i.e., a lead screw); however, in other configurations, the output portion may engage a corresponding nut with one or more ball bearings (i.e., a ball screw).

The nut may be keyed to an inner portion of a corresponding piston pocket so that the nut is prevented or restricted from spinning or rotating within the piston pocket. In other configurations, a clutch may be used to restrict or prevent the nut from spinning or rotating until a predetermined torque is reached at the spindle/nut device. For example, a clutch may be located between the nut and the piston pocket, which may cause the nut to rotate in the piston pocket after a sufficient torque has been applied to the spindle/nut device, as disclosed in commonly owned patent application No. 62/263,198 filed on Dec. 4, 2015, the contents of which is expressly incorporated by reference herein for all purposes.

The one or more spindle/nut devices may be one or more high efficiency devices, one or more low efficiency devices, or both. Preferably, especially in multiple-piston configurations, at least one of the spindle/nut devices is a low efficiency device and at least one of the spindle/nut devices is a high efficiency device.

A high efficiency device is a device that is more efficient than a low efficiency device. Efficiency may refer to how well, or how "efficiently" the device converts or transfers torque or a rotational load input into a linear load or output force. Depending on one or more considerations, such as lead angle and coefficient of friction, the one or more high efficiency devices may have an efficiency on the order of approximately 60% or more, approximately 70% or more, approximately 80% or more, approximately 85% or more, approximately 90% or more, approximately 95% or more, 97% or more, or even 99% or more.

The one or more high efficiency devices may be non-locking. In other words, because the coefficient of friction between the spindle and nut in a high efficiency device is generally low due to rolling friction, back driving may occur when a reaction force applied to the spindle, the nut, or both, is greater than the static force or coefficient of friction of the high efficiency device. This may undesirably cause the spindle, nut, or both to rotate or move in an opposing direction after a clamping force has been created thereby releasing the clamping load. Therefore, a mechanical brake or lock may be required to prevent back driving and thus sustain the linear output force and/or maintain the clamping force of the parking brake assembly. Without such a mechanical brake or lock, the high efficiency devices may undesirably, and prematurely, release the clamping force after it is created and the MGU is turned OFF. The mechanical brake may be the low-efficiency spindle/nut device, described below, which functions to self-lock due to one or more considerations, such as lead angle and coefficient of friction of the threads of the spindle and nut engagement.

For example, the one or more high efficiency devices may be one or more ball screws, roller screws, ball ramps, or a combination thereof. Exemplary ball screws may utilize ball bearings as load transfer elements between the nut and spindle or screw. During movement of the ball screw, the ball bearings may circulate along races or grooves between the spindle and the nut. A roller screw may be similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both. A ball ramp may include a rotating side and a stationary side with rolling elements interposed therebetween. A torque input causes the rotating side to rotate, which also causes the rolling elements to engage and roll along ramps between the rotating side and stationary side. The ramps include a deep end and a shallow end. When the rotating side is rotated such that the rolling elements move or roll to the shallow side of the ramp, the rolling elements provide an axial force against the stationary side, thus axially moving the stationary side.

The one or more low efficiency devices may be less efficient compared to the one or more high efficiency devices. Again, the efficiency may refer to how well or how efficiently the device converts a rotational load or torque input into a linear load or output force. The efficiency of the low efficiency devices may be dependent on factors such as lead angle, and/or coefficient of friction between the spindle and nut.

The one or more low efficiency devices may function as the mechanical brake or lock to prevent the one or more high efficiency devices from back driving. The one or more low efficiency devices may be self-locking, and may therefore sustain the clamping force of the parking brake assembly once created. Self-locking may mean the assembly will not back drive unless a sufficient opposing load or torque is applied to the low efficiency spindle, nut or both, that overcomes the friction load at the threads of the low efficiency device.

A lead screw is an example of a low efficiency device. An exemplary lead screw has mating helical threads between the spindle and nut with generally high friction therebetween. The friction between the spindle and nut must be first overcome before the lead screw can rotate. Accordingly, more torque is required to rotate a lead screw than the ball screw.

The parking brake system may be applied with a method. The following method steps can be performed in virtually any order to create the clamping force, a parking brake force, or both. It is understood that while the following steps refer to applying the parking brake, one or more of these steps may be used to apply the service brake (i.e., to generate clamping force to slow or stop a moving vehicle). In other words, rather than the service brake being applied by virtue of pressurizing hydraulic fluid to move the brake pistons and brake pads into contact with the brake rotor to generate clamping force, the service brake can be applied with the MGU or another motor, which function to move the spindle/nut devices as discussed herein for application of the parking brake.

The method of applying a parking brake may include a step of activating the parking brake system. This can be achieved in any suitable way. For example, the parking brake system can be activated by pushing or pulling a button, cable, lever, or pedal; putting the vehicle in a parking position (i.e., automatically activated); or a combination thereof.

Once activated, the MGU may generate torque. The torque may cause the gear in direct communication with the MGU to rotate. By virtue of the connection between the gears, the other gear also rotates. Rotation of the gears causes both of the spindle/nut devices to move. That is, the torque from the MGU and/or the gears causes the one or more spindles to rotate, which therefore causes the nuts to move axially towards a corresponding bottom wall of pistons. By virtue of their corresponding efficiency, the high efficiency spindle/nut device moves faster than the low efficiency spindle nut/device. Therefore, a gap defined between the nut of the high efficiency device and the corresponding bottom wall of the piston pocket is taken up before a gap defined between the nut of the low efficiency device and the corresponding bottom wall of the piston pocket.

After the nut of the high efficiency spindle/nut device contacts the corresponding bottom wall and the piston is moved thus moving the brake pad towards or against the rotor, the torque required to rotate the spindle of the high efficiency spindle/nut device increases. As the torque increases, a clutch located at the high efficiency side starts to slip thus reducing or limiting the torque at the high efficiency spindle/nut device while also maintaining the axial position of the corresponding nut and brake piston. All this time, the nut of the low efficiency spindle/nut device keeps moving to take up the corresponding gap. Eventually the gap is taken up and both ends of the brake pad are moved against the rotor thus creating the clamping force. When the torque builds up and thus the current draw at the MGU reaches a predetermined level indicative of clamp force, the MGU stops. Back driving of the high efficiency device is prevented by virtue of the low efficiency device.

It is worth nothing that to function properly, the high efficiency spindle/nut device must clamp first so that the clutch may adjust for pad thickness due to taper wear. If the high efficiency spindle/nut device does not clamp first, the low efficiency spindle/nut device will clamp to a higher force and the high efficiency spindle/nut device will clamp to a lower force.

FIG. 1 illustrates a brake system 100 and a parking brake system 102.

Figure 2:
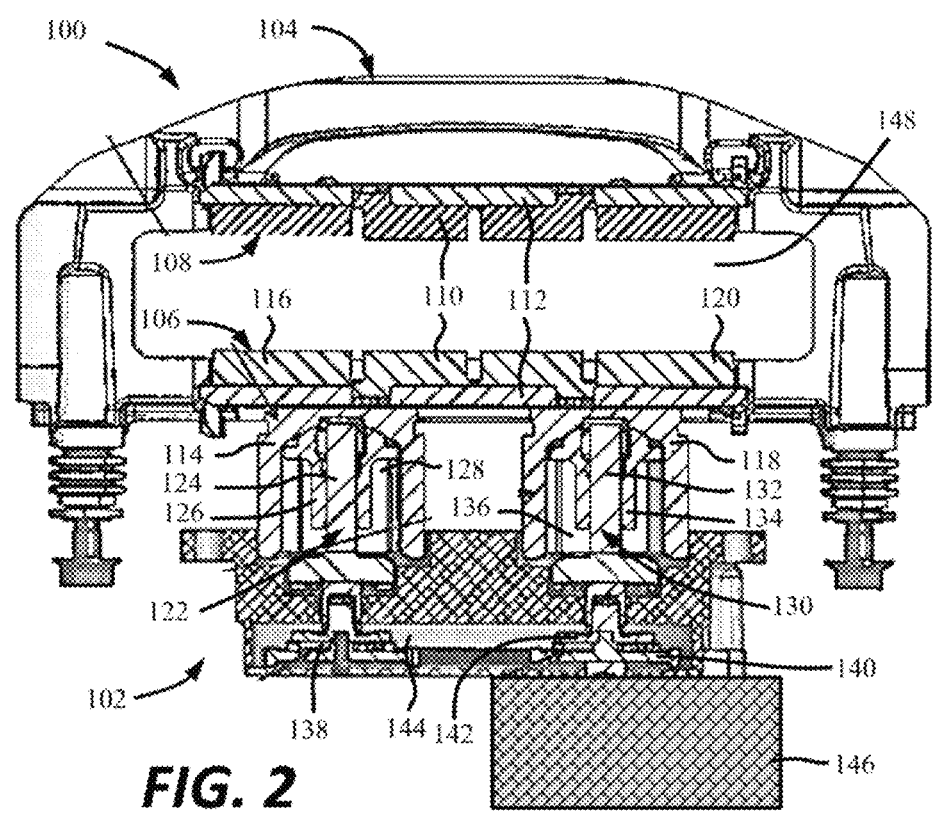
FIG. 2 is a cross-sectional view taken along line 2-2 of the brake system of FIG. 1.

FIG. 2 illustrates the brake system 100. The brake system 100 includes a brake caliper 104 supporting an inboard brake pad 106 and an outboard brake pad 108. A brake rotor 148 extends between the inboard and outboard brake pads 106, 108. The inboard brake pad 106 and outboard brake pad 108 each include a friction material 110 and a pressure plate 112. A first piston 114 is located near the first end 116 (i.e., the leading end) of the inboard brake pad 106, and a second piston 118 is located near the second end 120 (i.e., the trailing end) of the inboard brake pad 106. The parking brake system 102 includes a first spindle/nut device 122. The first spindle/nut device 122 includes a first spindle 124 and a first nut 126 received into the first piston pocket 128 of the first piston 114. The first spindle/nut device 122 may be a high efficiency device (e.g., a ball screw or a ball and ramp mechanism). The parking brake system 102 also includes a second spindle/nut device 130. The second spindle/nut device 130 includes a second spindle 132 and a second nut 134 received into the second piston pocket 136 of the second piston 118. The second spindle/nut device may be a low efficiency device (e.g., a lead screw).

The first spindle 124 is in communication with a first gear 138, and the second spindle 132 is in selective communication with a second gear 140 via a clutch 142. A belt or chain 144 connects the first and second gears 138, 140 together. The parking brake system 102 includes a motor gear unit (MGU) 146 in communication with the second gear 140.

The disclosures of all articles and references, including patent applications and publications, are incorporated by reference for all purposes.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. An assembly, comprising:
   a brake system comprising:
   a) a high efficiency device in communication with a first end of a brake pad;
   b) a low efficiency device in communication with a second end of the brake pad;
   wherein the high efficiency device is configured to move the first end of the brake pad against a brake rotor, and the low efficiency device is configured to move the second end of the brake pad against the brake rotor, and
   wherein the high efficiency device comprises a first spindle and a first nut, and rotation of the first spindle causes the first nut to axially move within a first piston pocket.

2. The assembly of claim 1, wherein the high efficiency device is a ball screw.

3. The assembly of claim 1, wherein the low efficiency device is a lead screw.

4. The assembly claim 1, wherein a first gear is in communication with the high efficiency device and a second gear is in communication with the low efficiency device,
   wherein rotation of the second gear in an apply direction causes the high efficiency device, the low efficiency device, or both to move the brake pad against the brake rotor,
   wherein rotation of the second gear in a release direction causes the high efficiency device, the low efficiency device, or both to move the brake pad away from the brake rotor, and
   wherein a motor rotates the second gear, and rotation of the second gear causes the first gear to rotate.

5. The assembly of claim 1, wherein the assembly comprises a clutch that limits torque from a motor to the high efficiency device when a predetermined torque has been applied to the high efficiency device.

6. The assembly of claim 1, wherein the first end of the brake pad is a trailing end of the brake pad and the second end is a leading end of the brake pad, and
   wherein the first end of the brake pad is moved against the brake rotor before the second end of the brake pad is moved against the brake rotor.

7. The assembly of claim 1, wherein the first end of the brake pad is a trailing end of the brake pad and the second end is a leading end of the brake pad,
   wherein the first end of the brake pad is moved against the brake rotor at generally the same time the second end of the brake pad is moved against the brake rotor.

8. The assembly of claim 1, wherein after one or both of the ends of the brake pad are moved against the brake rotor and a clamping force is created, the low efficiency device is configured to self-lock and prevent movement of the high efficiency device to maintain the clamping force at both the high efficiency device and the low efficiency device.

9. The assembly claim 1, wherein the low efficiency device comprises a second spindle and a second nut,
   wherein rotation of the second spindle causes the second nut to axially move within a second piston pocket.

10. An assembly including:
    a first piston;
    a second piston;
    a first spindle/nut device in communication with the first piston;
    a second spindle/nut device in communication with the second piston;
    wherein the first spindle/nut device is a ball screw and the second spindle/nut device is a lead screw, and
    wherein the first spindle/nut device comprises a first spindle and a first nut, and rotation of the first spindle causes the first nut to axially move inside of the first piston.

11. The assembly of claim 10, wherein the assembly comprises a motor, a first gear in communication with the first spindle/nut device, and a second gear in communication with the second spindle/nut device,
    wherein the motor causes the first gear and the second gear to rotate,
    wherein rotation of the second gear in an apply direction causes the first spindle/nut device, the second spindle/nut device, or both to move a brake pad towards a brake rotor to create a clamping force, and
    wherein rotation of the second gear in a release direction causes the first spindle/nut device, the second spindle/nut device, or both to move the brake pad away the brake rotor.

12. The assembly claim 11, wherein the motor includes an output that is in communication with an input of the second gear, and
    wherein a belt or chain connects the second gear and the first gear so that rotation of the second gear causes the first gear to rotate.

13. The assembly of claim 10, wherein the assembly comprises a clutch that limits torque from a motor to the first spindle/nut device when a predetermined torque has been applied to the first spindle/nut device.

14. The assembly of claim 10, wherein the second spindle/nut device comprises a second spindle and a second nut, and rotation of the second spindle causes the second nut to axially move inside of the second piston.

15. A method of operating a brake, comprising:
    applying torque to a first spindle/nut device so that an end of a brake pad is moved towards a braking surface, the first spindle/nut device comprises a spindle and a nut, and during the step of applying torque to the first spindle/nut device, the spindle rotates which causes the nut to move within a piston pocket;
    applying torque to a second spindle/nut device so that another end of the brake pad is moved towards the braking surface,
    wherein the first spindle/nut device is a ball screw, and the second spindle/nut device is a lead screw.

16. The method of claim 15, wherein the step of applying the torque to the first spindle/nut device includes a step of applying torque to a first gear that is received from a second gear via a belt or chain,
   wherein the second gear is in communication with a motor that generates the torque.

17. The method of claim 16, wherein the step of applying the torque to the second spindle/nut device includes a step of engaging a clutch.

18. The method of claim 15, wherein the step of applying the torque to the first spindle/nut device includes a step of applying torque from a first gear to the spindle so that the spindle rotates,
   wherein rotation of the spindle causes the nut to move a first piston towards or away from the brake pad.

19. The method of claim 18, wherein the step of applying the torque to the second spindle/nut device includes:
   engaging a clutch, and
   applying the torque from the second gear to a second spindle so that the second spindle rotates,
   wherein rotation of the second spindle causes a second nut to move a second piston towards or away from the brake pad.

20. The method of claim 15, wherein the second spindle/nut device comprises a second spindle and a second nut, and during the step of applying torque to the second spindle/nut device, the second spindle rotates which causes the second nut to move within a second piston pocket.

* * * * *